United States Patent
Coleman et al.

(10) Patent No.: US 9,379,815 B2
(45) Date of Patent: Jun. 28, 2016

(54) ELECTRO-OPTICAL PAYLOAD FOR HIGH-BANDWIDTH FREE SPACE OPTICAL COMMUNICATIONS

(71) Applicant: Raytheon Company, Waltham, MA (US)

(72) Inventors: Gary D. Coleman, El Segundo, CA (US); William J. Miniscalco, Marlborough, MA (US); Evan J. Matthews, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 46 days.

(21) Appl. No.: 14/469,538

(22) Filed: Aug. 26, 2014

(65) Prior Publication Data

US 2016/0065308 A1   Mar. 3, 2016

(51) Int. Cl.
*H04B 10/118* (2013.01)
*H04J 14/02* (2006.01)

(52) U.S. Cl.
CPC .............. *H04B 10/118* (2013.01); *H04J 14/02* (2013.01)

(58) Field of Classification Search
None
See application file for complete search history.

(56) References Cited

U.S. PATENT DOCUMENTS

| | | | |
|---|---|---|---|
| 5,661,582 | A | 8/1997 | Kintis et al. |
| 6,788,898 | B1 | 9/2004 | Britz et al. |
| 2013/0016967 | A1 | 1/2013 | Sato |
| 2014/0016932 | A1 | 1/2014 | Coleman et al. |

OTHER PUBLICATIONS

Dwivedi, "Net-Centric Optical Communication for the Global Information Grid", Proc. of SPIE, Defense Transformation and Network-Centric System, vol. 6249, No. 62490S, Chapter 4: Network Architecture, Availability, and Control, May 2, 2006 (12 pgs.).
Karafolas, "Optical Satellite Networks", Journal of Lightwave Technology, IEEE Service Center, New York, NY, vol. 18, No. 12, Dec. 1, 2000 (pp. 1792-1806).
Written Opinion of the International Searching Authority for International Application No. PCT/US2015/038689 filed Jun. 30, 2015, Written Opinion of the International Searching Authority mailed Oct. 20, 2015 (8 pgs.).
International Search Report for International Application No. PCT/US2015/038689, filed Jun. 30, 2015, International Search Report dated Oct. 9, 2015 and mailed Oct. 20, 2015 (4 pgs).

*Primary Examiner* — Darren E Wolf
(74) *Attorney, Agent, or Firm* — Lewis Roca Rothgerber Christie LLP (57) ABSTRACT

An electro-optical payload for free space optical communication includes: a plurality of optical beam expanders, each for receiving a respective optical signal; an optical cross-connect switch for directing respective optical signals to respective optical output signals; an electrical-to-optical conversion circuit coupled to an input of the optical cross-connect switch for converting an electrical signal to an optical signal for inputting to the optical cross-connect switch; an optical-to-electrical conversion circuit for converting an optical signal output from the optical cross-connect switch to an electrical signal; and an electrical regeneration circuit including a second optical-to-electrical conversion circuit coupled to an output of the optical cross-connect switch and a second electrical-to-optical conversion circuit coupled to an input of the optical cross-connect switch for converting an optical out signal of the optical cross-connect switch to an electrical signal.

16 Claims, 5 Drawing Sheets

ELECTRO-OPTICAL PAYLOAD FOR HIGH-BANDWIDTH FREE SPACE OPTICAL COMMUNICATIONS

FIELD OF THE INVENTION

The present invention relates to optical communication systems and more specifically to a laser conversion modules for such optical communication systems.

BACKGROUND

The use of the Internet worldwide is ever increasing with a high growth rate in the developing countries around the world. However, many emerging business centers in regions near the Equator are handicapped by poor connectivity to the Internet. These centers are typically located in countries with limited national high bandwidth network infrastructure, and sometimes surrounded by rugged terrain that makes terrestrial and undersea cable connections impractical.

Nevertheless, there is a continuing demand for high bandwidth connectivity to the Internet in these countries. Many of the most rapidly growing markets are both near the Equator and poorly connected via undersea cables. For some of the larger countries, the internal network infrastructure is relatively primitive. Furthermore, natural disasters can also disrupt connections, and the ability to rapidly reconfigure a communication network to reconnect the affected areas can be extremely valuable. In addition to the underserved markets, the major global telecom carriers of significant and growing wholesale bandwidth have needs for backup and replacement bandwidth to maintain Quality of Service agreements.

Geostationary Earth Orbit (GEO) communication satellites have inherently high latency, while other satellite communication networks suffer from some combination of limited worldwide connectivity, low bandwidth, or cost. The GEO satellites offer coverage of a reasonably large fraction of the Earth per satellite but have long communication paths, resulting in a signal latency of at least 120 msec per path. Moreover, multiple bounces may be required to provide routing, and connection between ground sites not within footprint of same satellite may require ground connections.

Recently, a constellation of Medium Earth Orbit (MEO) satellites have been designed to satisfy the need for an optical relay on a space platform that is capable of linking a redundantly connected ring of MEO satellites to a network of ground sites. This constellation of MEO satellites can do so transparently and independent of the optical format and modulation scheme. The communications relay payload on each satellite is configured to support growth of the constellation by being able to rapidly reconfigure the network to drop any failed satellite out of the network. However, these optical communications relay payload and architecture are optimized for transmitting large amounts of data from one ground site (Lightway) to another Lightway through space, but do not have any ability to uplink data from a Lightway to a satellite or to downlink data from a satellite to the Lightway. The present invention enables the laser relay satellites (LRSs) to communicate with other satellites, through both laser and electrical (e.g., RF) links, when desired.

SUMMARY

In some embodiments, the present invention is an electro-optical payload for free space optical communication. The electro-optical payload includes: a plurality of optical beam expanders, each for receiving a respective optical signal of a plurality of incoming optical signals; an optical cross-connect switch for directing respective optical input signals to respective optical output signals; an electrical-to-optical conversion circuit coupled to an input of the optical cross-connect switch for converting an electrical signal to an optical signal for inputting to the optical cross-connect switch; an optical-to-electrical conversion circuit coupled to an output of the optical cross-connect switch for converting an optical signal output from the optical cross-connect switch to an electrical signal; and an electrical regeneration circuit including a second optical-to-electrical conversion circuit coupled to an output of the optical cross-connect switch and a second electrical-to-optical conversion circuit coupled to an input of the optical cross-connect switch for converting an optical out signal of the optical cross-connect switch to an electrical signal. The electrical regeneration circuit performs regeneration processing on the electrical signal and converts the processed electrical signal to an optical signal to be input to the optical cross-connect switch. Some of the output optical signals from the optical cross-connect switch are inputted to a respective optical beam expander for transmission to respective destinations, as outgoing optical signals.

In some embodiments, the present invention is a satellite for free space optical communication. The satellite includes a plurality of up/down-link optical telescopes for optical communication with one or more ground sites; a plurality of inter-satellite telescopes for inter-satellite optical communications; and an electro-optical payload. The electro-optical payload includes a plurality of optical beam expanders, each for receiving a respective optical signal of a plurality of incoming optical signals; an optical cross-connect switch for directing respective optical input signals to respective optical output signals; an electrical-to-optical conversion circuit coupled to an input of the optical cross-connect switch for converting an electrical signal to an optical signal for inputting to the optical cross-connect switch; an optical-to-electrical conversion circuit coupled to an output of the optical cross-connect switch for converting an optical signal output from the optical cross-connect switch to an electrical signal; and an electrical regeneration circuit including a second optical-to-electrical conversion circuit coupled to an output of the optical cross-connect switch and a second electrical-to-optical conversion circuit coupled to an input of the optical cross-connect switch for converting an optical out signal of the optical cross-connect switch to an electrical signal.

The electrical regeneration circuit performs regeneration processing on the electrical signal and converts the processed electrical signal to an optical signal to be input to the optical cross-connect switch. Some of the output optical signals from the optical cross-connect switch are inputted to a respective optical beam expander for transmission to respective destinations, as outgoing optical signals.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention is directed to a laser conversion modules for laser relay modules (LRMs) in free space optical communication systems. The on-board optical and electrical hardware is designed to be as agnostic as possible about future evolution of optical communication standards, so it doesn't become obsolete over time. The ground hardware can be upgraded incrementally to support higher bandwidths. The network is highly flexible, with multiple redundant paths and rapid reconfiguration.

The design of the LRMs makes it practical to build hundreds of them, so the economies of scale help reduce cost. Each LRM operates in an optically transparent mode, with no conversion of the signal from the optical domain to the electrical one. But there are applications that require optical-to-electrical (O-E) or electrical-to-optical (E-O) conversion. Rather than modifying the LRMs themselves to allow them to support O-E and E-O conversions, the present augments each laser relay satellite with one or more small electronic boxes, called Laser Conversion Modules (LCMs) that add the laser conversion functions to the extent necessary.

Adding limited O-E and E-O conversion circuits/functions to the LRMs allows the network operations to be more flexible and more robust. This is especially true in terms of supporting longer paths through the network, where the signal-to-noise ratio (SNR) will be inadequate to provide the desired bit error rate (BER) without sending the data to the ground for more complete regeneration. The conversion circuits also allow the LRMs to be used in a variety of missions, such as relaying data from deep space probes back to the earth, where the build-up of noise would otherwise degrade the BER.

The LCMs also allow the network to support data downlink from and data delivery to satellites in the network. An E-O LCM can be used to generate an optical signal that is added to the channels routed to an LRM for data transmission. Similarly, an O-E LCM can be used to convert an optical signal to an electrical one that can be processed on-board the satellite, stored for later use, or transmitted using RF communication hardware. By combining an O-E LCM with an E-O version, with electrical signal regeneration hardware between the two, it is possible to perform full 3R regeneration, with reamplification, reshaping, and rephasing. This 3R regeneration recreates a pristine high SNR signal, resetting the build-up in in-channel noise. If Forward Error Correction (FEC) is incorporated during the regeneration, then bit errors can be corrected as part of the process. Adding these capabilities to an LRS can greatly expand its utility, without adding unacceptable power demands and mass.

Figure 1:
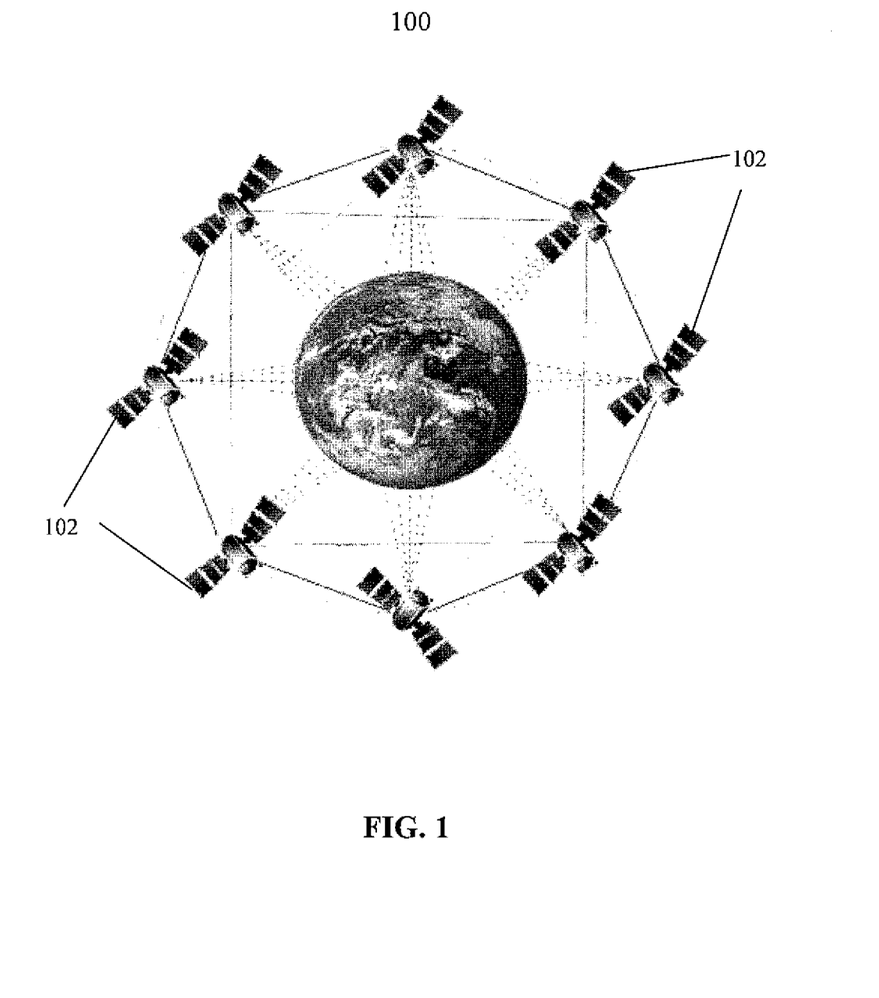
FIG. 1 shows an exemplary MEO constellation of a plurality of satellites with optical communication, according to some embodiments of the present invention.

FIG. 1 shows an exemplary MEO constellation 100 of a plurality of satellites 102, according to some embodiments of the present invention. As shown, eight satellites 102 (8-ball constellation) are arranged and networked together to provide a continuous coverage of a band of the earth, especially around the equatorial orbits. Although, eight satellites are shown as an example, the present invention is not limited to eight satellites and a different number of satellites, for example, four, sixteen or other number of satellites can be used for more coverage time per satellite and/or redundancy purposes. Each satellite of the MEO constellation is optically coupled to multiple nearest neighbors (for example, four or more, except in the minimal 4-ball constellation, where only two neighbors are visible) using inter-satellite lasercom (ISL) optical telescopes. In some embodiments, circular polarization or spectral diversity is used to provide dual optical signal paths per telescope. In some embodiments, circular polarization is used to separate transmitted signals from received signals.

The ISL optical telescopes are capable of adjusting their elevation angle to allow (accommodate) a different angle of optical communication to accommodate adding or removing satellites (i.e., changes in the number of the satellites in the constellation) from the ring (constellation) and re-phasing the satellites that are currently in use.

For example, in the case of a new satellite being launched into the constellation, one or more commands for modifying the trajectory and reconfiguring the inter-satellite and ground optical communications (telescopes) are sent, for example, from a ground telescope in a ground site to each satellite.

In some embodiments, each satellite is connected to multiple ground sites using up/down-link optical telescopes. The minimum possible configuration is a single up/down-link telescope per satellite, however, multiple telescopes increase the overall capacity of the network and would provide a larger revenue stream. The host satellite can easily support at least four up/down-link telescopes, although six or eight telescopes may be preferable in some embodiments. Connections are scheduled so that at least one up/down-link telescope is free whenever the ground connection from a preceding satellite in the constellation is nearing an end, allowing the network to establish a new connection before breaking the old one.

Site diversity on the ground is used to mitigate weather outages, with multiple (two or more) terminals (ground optical telescopes) in relatively close proximity to each other, for example, within a few hundred kilometers of the associated ground gateway. Two of these ground terminals/telescopes are selected for each pass of an optically connected satellite to the ground site, based on predicted cloud-free line of sight probability for the pass. These two ground terminals may be tracked by separate up/down-link telescopes on the satellite, but it would also be possible to utilize a dual-tracking system with a field of view large enough to cover both ground terminals simultaneously by a single telescope. In some embodiments, dual polarization is used as one approach to distinguishing between the signals from the two ground terminals when spatial separation is inadequate. In some embodiments, different spectral bands can be used for the beacons.

In addition, each ground site would have at least two up/down-link telescopes so that new connections can be established before the old one is broken, as the satellite constellation passes the ground site. This way, the satellite constellation has a high availability by using site diversity, with monitoring and real-time switching between separate ground terminals supporting a single gateway/site. During a pass, the up/down-link telescopes continuously and in real time track both current ground sites/terminals, using an optical beacon, and send data to the one with the clearest line of sight. The multiple (e.g., two or more) ground terminals in relatively close proximity to each other are in direct communication with a shared gateway via wired or wireless, electrical or optical communication schemes. The gateway may be located in a carrier hotel or other site with multiple connections to local high speed Internet networks.

In some embodiments, each of the ground terminals includes a telescope and gimbal system for steering the optical beams at one or more of the satellites. In some embodiments, ground-based gimbaled lasercom terminals/telescopes track individual satellites during each pass. In some embodiments, a network operations center sends up one or more switching commands to configure the data paths to maintain continuous connectivity between desired ground sites, with extra links used to make new connections before the old ones are dropped as the satellites orbit around the earth.

Although the satellite constellation of FIG. 1 is described with respect to a MEO orbit, a combination of GEO and MEO orbit satellites are also possible and are within the scope of the present invention. In some embodiments, a combination of Low Earth Orbit (LEO) and MEO orbit satellites are also possible and are also within the scope of the present invention. There are also multiple ways to add one or more LEO satellites to the constellation of the present invention.

Figure 2:
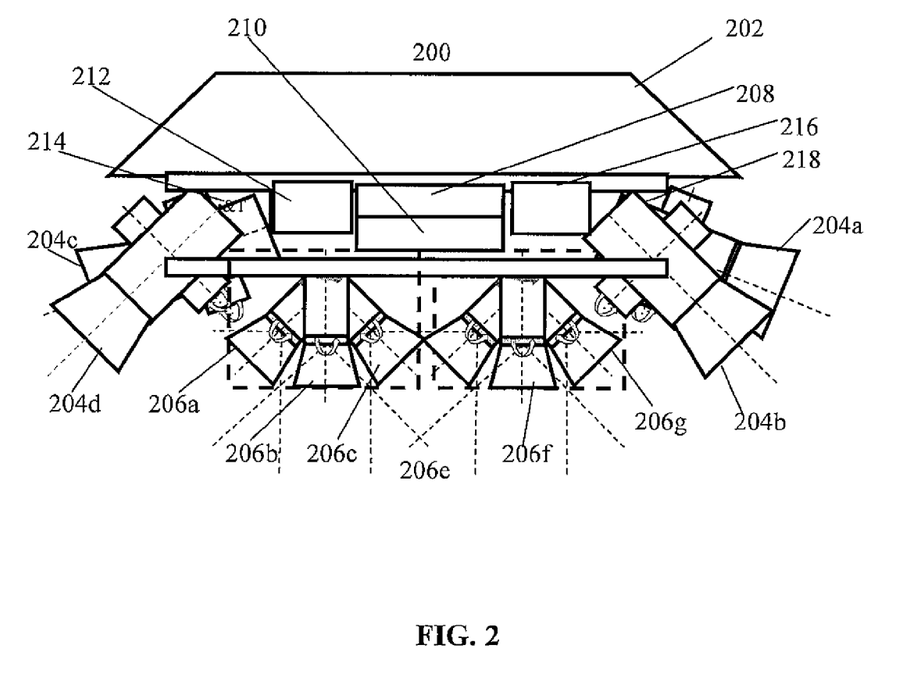
FIG. 2 is an exemplary layout view of a satellite payload including cross link and up/down telescopes, according to some embodiments of the present invention.

FIG. 2 is an exemplary layout view of a satellite payload 200 including cross link and up/down telescopes, according to some embodiments of the present invention. As shown, a plurality of inter-satellite (cross link) telescopes 204a to 204c (four shown in this exemplary figure) are installed on an exterior portion of each satellite for inter-satellite optical communications. In this example, telescopes 204a and 204b are located at the right side of the satellite and communicate with one or more of its nearest neighbor satellites on its right side. For example, 204a would point to and communicate with the nearest neighboring satellite (i.e., adjacent satellite) on that side and 204b would point to and communicate with the next nearest neighboring satellite (i.e., two satellites away) on that side. Similarly, telescopes 204c and 204d are located at the left side and communicate with one or more of its nearest neighbor satellites on its left side. Each of the cross link telescopes are capable of being selectively steered for calibrating the optical communication with the neighboring satellites, and/or in the case of a new satellite being added to the constellation, for establishing new optical communication with the new satellite. That is, the inter-satellite optical links connect the respective satellite in a redundant network.

In some embodiments, the cross link telescopes 204a to 204d include adjustable elevation settings to track the neighboring satellites in the constellation. In some embodiments, two nearest neighbors and two next-nearest neighbors are utilized for inter-satellite communications. Beam steering mirrors used to compensate for host satellite jitter and slight orbit differences. Elevation adjustment is used on an infrequent basis to add or drop satellites into the constellation and communication ring.

Additionally, there are a plurality of (gimbaled) up/down link telescopes 206a to 206g (six shown in this exemplary figure) installed on the exterior portion of each satellite for ground communication and site diversity. In some embodiments, each up/down link telescope supports at least a single high-bandwidth (e.g., 100 Gbps) bi-directional connection between ground sites around the world. Another up/down link telescope either on the same satellite or a connected satellite is used for the other end of the connection. With eight satellites and six up/down-link telescopes per satellite, the network can support up to 24 of the high-bandwidth bi-direction connections.

The optical on-board hardware (payload) of each satellite includes an optical cross-connect switch matrix 208 and a "command, control, and telemetry" (CC&T) subsystem 214 (which may be optical). The electrical on-board hardware (payload) of each satellite includes one or more O-E LCMs 212 to convert a selected optical signal from the optical switch matric 208 to an electrical signal, an electrical signal regeneration system 210, and one or more E-O LCMs 216 for converting the electrical signals back to optical signals to be input to the optical switch matrix 208. There may also be direct electrical inputs to the E-O LCMs and direct electrical outputs from the O-E LCMs. These electrical inputs and outputs may be coming from and going to the data storage unit 214. The on-board payload also includes a computer or one or more processors and associated support components 218; and one or more power supplies (not shown).

Given the way that the LRMs are connected through the optical switch matrix 208, using that same approach to connect the LCMs will provide real flexibility. The LCMs of the present invention can be used to convert an optical signal to an electrical one, which can then be sent to an RF antenna, or to convert an electrical signal to an optical one, which can be inserted into the lasercom network. The LCMs can also be used to convert a very weak optical signal to an electrical one, apply 3R regeneration (re-amplification, re-shaping, and re-phasing) to it, and then convert it back to an optical signal. FEC circuitry may also be applied and at this stage to perform error corrections. This is useful for deep space relay applications, where the data rate will be low.

Each of the plurality of satellites includes optical circuitry/hardware for optically processing and switching incoming and outgoing optical signals without converting the optical signals into electrical signals. The optical on-board hardware receives an incoming optical data stream from the ground and/or one or more neighboring satellites, optically regenerates it (which may be limited to reamplification or may be complete 3R regeneration), uses optical switches to direct it to the desired (selected) output path, and sends it toward its final destination (ground and/or one or more neighboring satellites).

Similarly, the electrical on-board hardware receives an incoming electrical signal from the ground and/or one or more neighboring satellites, electrically regenerates and/or processes it, then converts the process electrical signal to an optical signal to be input to the optical switches for transmission toward its final destination. In some embodiments, the incoming signal may be an optical signal that is converted to an electrical, by an e-to-electrical conversion circuit, for more complex regeneration processing (or to be input to the computer 218 for processing). The optical signal output from the switch may be converted to an electrical signal, using an optical-to-electrical conversion circuit. Similarly, any electrical signal originating from for example, the computer 218, data storage unit 214, the ground, other satellites or on-board sensors, may be converted to an optical signal to be routed by the optical switch matrix 208 and transmitted to its next destination by the telescopes.

Figure 3:
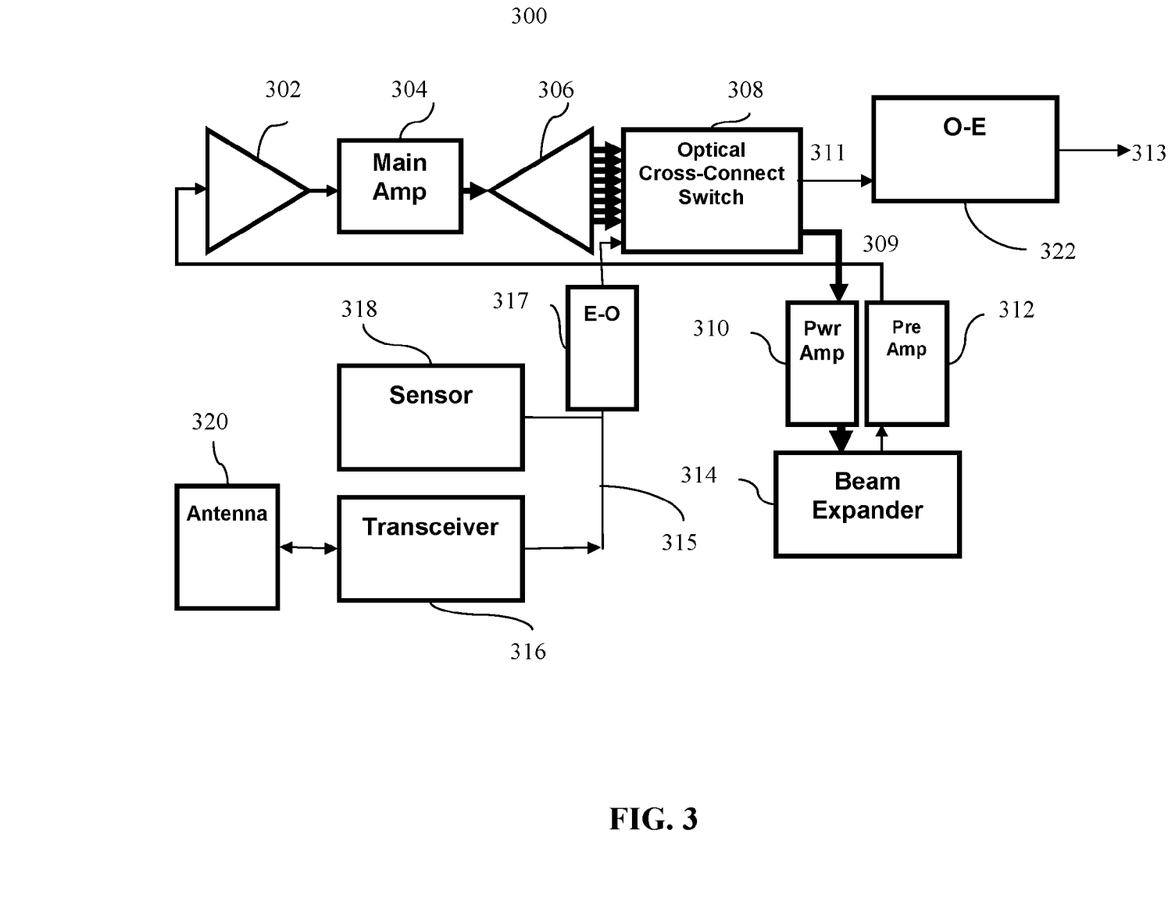
FIG. 3 is a simplified block diagram for an exemplary on-board hardware system, according to some embodiments of the present invention.

FIG. 3 is a simplified block diagram for an exemplary on-board hardware system 300, according to some embodiments of the present invention. This figure is simplified to illustrate only two optical destinations (outputs) from the optical switch 308. As shown, an incoming optical signal is received by an optical beam expander 314 and pre-amplified by an optical preamplifier 312. The pre-amplified optical signals may then be combined by a multiplexer 302. The combined signals for the individual channels are then amplified by an optical main amplifier 304, de-multiplexed by de-multiplexor 306 and then fed to an optical (crossbar) switch 308. The optical switch 308 then outputs an optical signal 309 at one (or more) of its outputs, depending on the switching instruction. The optical signal 309 is then transmitted to a selected destination by the beam expander 314, after it is amplified by a final power amplifier 310. In some embodiments, the multiplexer and de-multiplexor can be eliminated because separate main amplifiers are used for each preamplifier.

Similarly, an electrical input signal 315, for example, an RF signal, is received by a (RF) transceiver 316 via an antenna 320, or from any on-board electrical devices or sensors 318. The electrical signal 315 is then converted to an optical signal by an electrical-to-optical (E-O) conversion circuit 317 and the resulting optical signal is input to the optical switch 308. The optical switch 308 includes one or more optical-to-electrical (O-E) conversion circuits 322 at respective one or more of its outputs. If any of the optical inputs of the optical switch 308 needs to be converted to an electrical signal, the switching instructions instruct the optical switch 308 to switch that input to one of the outputs that has an optical-to-electrical conversion circuit 322. The electrical output 313 can then be fed to the transceiver 316 to be electrically transmitted off-board via antenna 320. Alternatively, or in addition, the electrical output 313 may be fed to any on-board electrical device, including a processor or memory.

The optical (crossbar) switch is capable of performing different switching approaches, which allows a fully transparent point-to-point connections or a more flexible mesh connection between all of the ground sites. Each input can be connected to any output, without blocking the other inputs. In some embodiments, the optical switch uses Microelectromechanical systems (MEMS) technology, with multiple small mirrors tilting as commanded to reflect each optical signal from its input to the desired output. In some embodiments, a low-loss piezoelectric switch is used.

Figure 4:
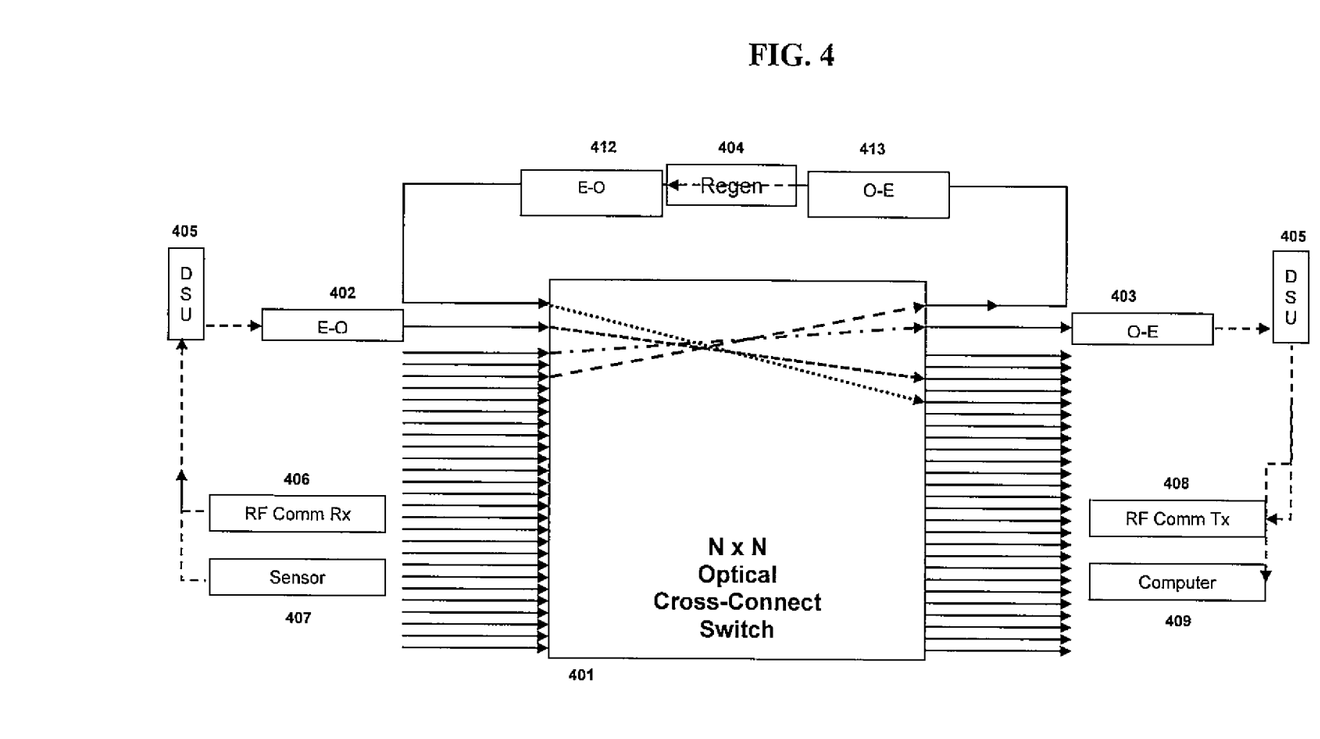
FIG. 4 is a simplified block diagram for an exemplary optical cross-connect switch including a number of laser conversion modules (LCMs) at some of its inputs and outputs, according to some embodiments of the present invention.

FIG. 4 is a simplified block diagram for an exemplary optical cross-connect switch including a number of laser conversion modules (LCMs) at its input and outputs, according to some embodiments of the present invention. As illustrated, an N×N optical cross-connect switch 401 is capable of routing any of its optical inputs to any one or more of its outputs. The optical inputs may be received from LRMs of other satellites, other LRMs of the same satellite, or any on-board optical devices. Similarly, the optical outputs may be transmitted to LRMs of other satellites, other LRMs of the same satellite, or any on-board optical devices. Additionally, there are one or more E-O conversion circuits (LCMs) 402 at respective one or more input channels of the optical switch 401. The E-O conversion circuits 402 take an electrical signal, for example, from an on-board digital storage unit (DSU) 405, an on-board (RF) receiver (transceiver) 406, directly from the on-board computer 409 and/or on-board sensor 407. The on-board (RF) receiver 406, the on-board computer 409 and/or on-board sensor 407 may first output their electrical signals into the DSU 405 for storage, before the electrical signals are outputted into the E-O conversion circuits 402.

Likewise, there are one or more O-E conversion circuits (LCMs) 403 at respective one or more output channels of the optical switch 401. The one or more O-E conversion circuits 403 take the respective optical outputs of the optical switch, convert them into electrical signals to be transmitted by an on-board (RF) transmitter (transceiver) 408, stored by the on-board DSU 405, processed by the on-board computer 409, and/or sent to any other on-board electrical devices. The transmitter (transceiver) 408 can then transmit the electrical signal to the other LRMs or the ground stations.

Additionally, an O-E conversion circuit 413 converts an optical signal from the optical switch into an electrical signal to be (electrically) regenerated by an electrical regeneration circuit 404. The regenerated electrical signal can then be converted into an optical signal by an E-O conversion circuit 412 and input back into the switch to be directed into its next destination. The elements can be combined into a single unit, as shown in FIG. 4, or the regeneration circuit 404 can be connected to two electrical switches that allow any O-E conversion circuit 403 to provide the electrical input signal to the regeneration circuit and any E-O conversion circuit 402 to convert the electrical output signal back to optical form.

In some embodiments, different E-O LCMs can support different optical modulation schemes, and different O-E LCM can support those same or other optical modulation schemes. In this way, LCMs that combine O-E and E-O conversion (O-E-O LCM), with the option of including electrical re-shaping and re-phasing of the electrical signals can support conversion from one optical modulation scheme to another. In addition, the O-E-O LCMs can convert the wavelength of the optical signal, using detectors that are sensitive to a broad spectral range in the O-E LCM and tunable laser sources in the E-O LCM.

As described above, three types of LCMs may be utilized in the present invention. The E-O LCM is capable of using an input electrical bit stream at a given data rate and using that signal to modulate a tunable laser master oscillator. The modulation occurs before a low noise pre-amp is used to amplify the optical signal to match the power level of the other optical signals going to the optical cross-connect switch. The output optical signal is then injected into an optical fiber and connected to an input port on the optical cross-connect switch. The optical signal is then connected to the appropriate output port and sent to the desired LRM, where the power amplifier provides the final amplification necessary to reach another node in the network and transmits it to that node. This way, the E-O LCM, in conjunction with an LRM, provides the functionality of a transmit (Tx) laser space terminal In some embodiments, the O-E LCM is capable of taking an optical signal from an output port of the optical cross-connect switch and convert it into an electrical bit stream. The O-E LCM contains a low noise detector, and may include electrical filtering to clean up (i.e., reshape and rephase) the analog electrical output before digitization. The O-E LCM, in conjunction with a LRM, provides the functionality of a receive (Rx) laser space terminal. In these embodiments, the LCM is capable of allowing any other node in the network, either on the ground or in space, to send high bandwidth data signals to the host satellite.

The O-E-O LCM combines the functionality of the first two LCMs, with some additional optional electronics (if needed) to reshape and rephase the signal. The OXC allows the extraction of one or more specific channels from any DWDM optical signal, and the insertion of one or more channels, at the same or new wavelengths. A combination of both E-O and O-E LCMs, in conjunction with a LRM, provides the functionality of a transmit and receive laser space terminal. The O-E-O LCM, in conjunction with at least two LRMs, extends and enhances the capabilities of the LRMs to lower signal-to-noise (SNR) regimes relevant to deep space missions. In the normal optically transparent relay mode of operation, the build-up of noise in the sequence of nodes is accommodated by increasing the signal level from the power amplifiers, but there is a limit to the achievable power level from space-qualified radiation hard optical power amplifiers. By performing the full 3-R regeneration for a given channel in the electrical domain, it is possible clean up an analog electrical signal and reduce the noise level. Converting the signal to the digital domain allows the use of FEC on-board the host satellite, completely eliminating all correctable bit errors and recreating a pristine signal.

In some embodiments, these LCMs contain only the hardware required for the appropriate conversion, and thus the rest of the laser space terminal hardware is contained in standard Laser Relay Modules. The LCMs can be connected directly to LRMs via fibers for a very simple configuration, or indirectly through the optical cross-connect switch 401 on a LRS.

Figure 5:
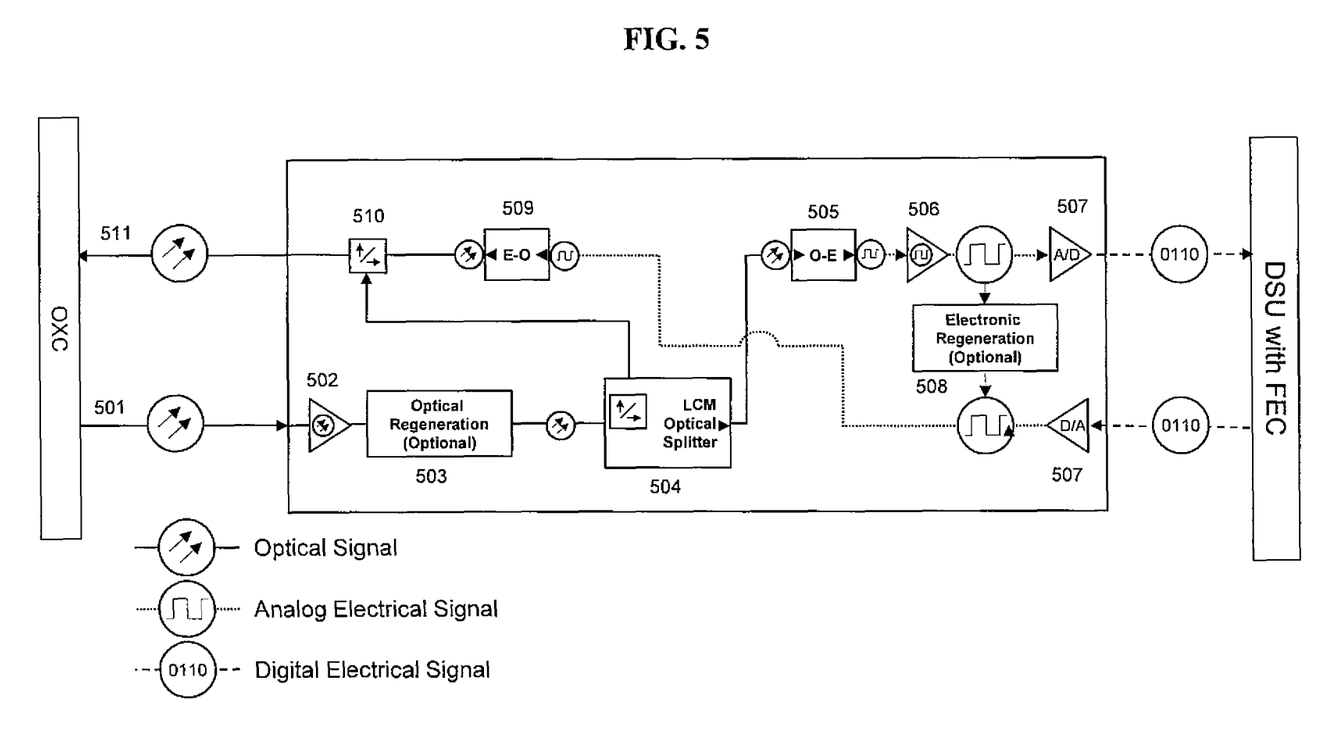
FIG. 5 is a simplified block diagram for an exemplary O-E-O laser conversion module (LCM) including regeneration functionality, according to some embodiments of the present invention.

FIG. 5 is a simplified block diagram for an exemplary O-E-O laser conversion module (LCM) including regeneration functionality, according to some embodiments of the present invention. As depicted, an optical signal is received from an output port 501 of an optical cross-connect switch and then amplified by an optical amplifier 502. The signal then may be regenerated further by an optional nonlinear optical regeneration system 503 as the relevant technology becomes space-qualified. An optical splitter or switch 504 then transmits the optical signal either to the O-E detector 505 or to an optical combiner 510 or to both. The output of the O-E detector 504 is an analog electrical signal, which may be amplified by an electrical amplifier 506. At this point the high speed analog electrical signal may undergo further regeneration, such as reshaping and rephasing or it may be digitized by a Analog-to-Digital (A/D) converter and transferred to the DSU (Data Storage Unit). The DSU may incorporate FEC circuitry to fix all correctable bit errors in the input data stream. The FEC may also be used on the output data stream to correct bit errors generated by radiation hits to the DSU. The generated data stream is transferred to a high speed Digital-to-Analog (D/A) converter. The resulting high speed analog electrical signal is then sent to the E-O unit, which includes a continuous wave laser source and a modulator. The output optical signal is then transmitted to the optical combiner 510, before being sent to an input port 511 of the OXC It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. An electro-optical payload for free space optical communication comprising:
a plurality of optical beam expanders, each for receiving an optical signal of a plurality of incoming optical signals;
an optical cross-connect switch coupled to the plurality of optical beam expanders for directing each of the plurality of incoming optical signals to an optical output signal, respectively;
a first electrical-to-optical conversion circuit coupled to a first input of the optical cross-connect switch for converting an electrical signal to an optical signal for inputting to the optical cross-connect switch;
a first optical-to-electrical conversion circuit coupled to a first output of the optical cross-connect switch for converting an optical signal output from the optical cross-connect switch to an electrical signal;
a second optical-to-electrical conversion circuit coupled to a second output of the optical cross-connect switch;
an electrical regeneration circuit coupled to the second optical-to-electrical conversion circuit for performing regeneration on an electrical signal output from the second optical-to-electrical conversion circuit and output a regenerated electrical signal; and
a second electrical-to-optical conversion circuit coupled to the electrical regeneration circuit for converting the regenerated electrical signal to an optical signal to be input to the optical cross-connect switch,
wherein some of the output optical signals from the optical cross-connect switch are inputted to a respective one of the plurality of optical beam expanders for transmission to one or more destinations, as outgoing optical signals;
a single optical main amplifier;
an optical multiplexer for combining the incoming optical signals and outputting the combined optical signals to the single optical main amplifier for amplifying the combined optical signals; and
a demultiplexer for demultiplexing the amplified combined optical signals for outputting to the optical cross-connect switch.

2. The electro-optical payload of claim 1, further comprising a plurality of optical power amplifiers optically coupled to the cross-connect optical switch and respective optical beam expanders for amplifying the outgoing optical signals.

3. The electro-optical payload of claim 1, wherein four optical beam expanders are used for optical communication with two nearest neighboring satellites, one of each side, and two next nearest neighboring satellites, one on each side.

4. The electro-optical payload of claim 1, wherein each of the plurality of optical beam expanders associated with optical communications with the ground sites is configured to utilize Dense Wavelength Diversity Multiplexing (DWDM) to provide bi-directional links with each ground site.

5. The electro-optical payload of claim 4, wherein each of the plurality of optical beam expanders associated with optical communications with the ground sites is further configured to utilize one or more of polarization and wavelength diversity to isolate two data streams in a bi-directional link.

6. The electro-optical payload of claim 1, wherein the optical cross-connect switch is configured to receive one or more switching commands from a ground operations center to configure optical data paths and to maintain continuous connectivity between desired ground sites.

7. The electro-optical payload of claim 1, further comprising one or more lasers configured to amplify one or more of the optical signals.

8. The electro-optical payload of claim 1, further comprising an onboard storage unit, wherein the electrical signal from the optical-to-electrical conversion circuit is input to the onboard storage unit.

9. The electro-optical payload of claim 1, further comprising an onboard transmitter, wherein the electrical signal from the optical-to-electrical conversion circuit is input to the transmitter for transmission to an off-board destination.

10. The electro-optical payload of claim 1, further comprising an onboard receiver and an antenna, wherein the electrical signal input to the electrical-to-optical conversion circuit is received from the receiver via the antenna.

11. The electro-optical payload of claim 1, further comprising an onboard storage unit, wherein the electrical signal input to the electrical-to-optical conversion circuit is received from the on-board storage unit.

12. The electro-optical payload of claim 1, further comprising an onboard sensor, wherein the electrical signal input to the electrical-to-optical conversion circuit is received from the on-board sensor.

13. The electro-optical payload of claim 1, further comprising an onboard computer, wherein the electrical signal input to the electrical-to-optical conversion circuit is received from the on-board computer.

14. A satellite for free space optical communication comprising:
- a plurality of up/down-link optical telescopes for optical communication with one or more ground sites;
- a plurality of inter-satellite telescopes for inter-satellite optical communications; and
- an electro-optical payload including:
- a plurality of optical beam expanders, each for receiving an optical signal of a plurality of incoming optical signals;
- an optical cross-connect switch coupled to the plurality of optical beam expanders for directing each of the plurality of incoming optical signals to an optical output signal, respectively;
- a first electrical-to-optical conversion circuit coupled to a first input of the optical cross-connect switch for converting an electrical signal to an optical signal for inputting to the optical cross-connect switch;
- a first optical-to-electrical conversion circuit coupled to a first output of the optical cross-connect switch for converting an optical signal output from the optical cross-connect switch to an electrical signal;
- a second optical-to-electrical conversion circuit coupled to a second output of the optical cross-connect switch;
- an electrical regeneration circuit coupled to the second optical-to-electrical conversion circuit for performing regeneration on an electrical signal output from the second optical-to-electrical conversion circuit and output a regenerated electrical signal; and
- a second electrical-to-optical conversion circuit coupled to the electrical regeneration circuit for converting the regenerated electrical signal to an optical signal to be input to the optical cross-connect switch,
- wherein some of the output optical signals from the optical cross-connect switch are inputted to a respective one of the plurality of optical beam expanders for transmission to one or more destinations, as outgoing optical signals;
- a single optical main amplifier;
- an optical multiplexer for combining the incoming optical signals and outputting the combined optical signals to the single optical main amplifier for amplifying the combined optical signals; and
- a demultiplexer for demultiplexing the amplified combined optical signals for outputting to the optical cross-connect switch.

15. The satellite of claim 14, wherein the electro-optical payload further comprises: a plurality of optical power amplifiers optically coupled to the cross-connect optical switch and respective optical beam expanders for amplifying the outgoing optical signals.

16. The satellite of claim 14, wherein four optical beam expanders are used for optical communication with two nearest neighboring satellites, one of each side, and two next nearest neighboring satellites, one on each side.

* * * * *